United States Patent [19]

Seaton et al.

[11] Patent Number: 5,591,299
[45] Date of Patent: Jan. 7, 1997

[54] SYSTEM FOR PROVIDING INTEGRATED MONITORING, CONTROL AND DIAGNOSTICS FUNCTIONS FOR SEMICONDUCTOR SPRAY PROCESS TOOLS

[75] Inventors: Jay J. Seaton; Michael Allen, both of Austin, Tex.; Donald Landis, Hollis, N.H.; Patrick Lee, Austin, Tex.; David Linzy, Merrimack; Susan B. Luca, Hollis, both of N.H.

[73] Assignee: Advanced Micro Devices, Inc., Austin, Tex.

[21] Appl. No.: 430,329

[22] Filed: Apr. 28, 1995

[51] Int. Cl.⁶ ............................................. H01L 21/00
[52] U.S. Cl. .................. 156/626.1; 156/345; 156/627.1; 216/84; 216/92
[58] Field of Search .................... 156/626.1, 627.1, 156/640.1, 345 MC, 345 LS; 216/84, 92

[56] References Cited

U.S. PATENT DOCUMENTS 3,630,804  12/1971  Coffman et al. .................. 156/345 LS
5,445,705   8/1995  Barbee et al. ..................... 156/627.1

*Primary Examiner*—William Powell
*Attorney, Agent, or Firm*—Haynes and Boone, L.L.P.

[57] ABSTRACT

Method and apparatus for providing integrated monitoring, control and diagnostics functions for semiconductor spray processors is disclosed. In a preferred embodiment, a spray processor host system of the present invention comprises a plurality of PC-class computers interconnected via a network link. Each of a first subset of the spray processor host system computers comprises a supervisor computer connected to one of a plurality of spray process tools, which in the preferred embodiment comprise Mercury® MP processors. The supervisor computers provide ongoing information exchange with the processors and maintain up-to-date status information. Each supervisor computer maintains an event log of processor operations and operator actions, as well as data capture files for storing process variables captured by the supervisor computer. Each of a second subset of the spray processor host system computers comprises an engineer computer for providing the system operator with a command driven interface to the spray processor host system. Each engineer computer can monitor a plurality of supervisor computers and is used to enable such functions as recipe directory editing, recipe downloading, event log searching, data capture file data graphing and processor status viewing. A third subset of the spray processor host system computers comprises a bridge computer for providing a communications link between the supervisor computers and a upstream host computer outside the spray processor host system, for example, a lot scheduling or material flow control computer.

48 Claims, 12 Drawing Sheets

```
═ 1: FSI_1 ══════════ FSIHOST SYSTEM STATUS ═══ 09-07-94 10:57:53 ══╗─300
  FSI    STEP    RECIPE           STATUS     OWNER    END TIME
  FSI_1   16   55 FSI3/EEX/NDO   EXECUTING    PROD    15:23:36
════════════════════ RECIPE NAME AND STATUS ═══════════════════
  Recipe: FSI3/EEX/NDO(55); Step time=29sec; Time remaining=24:14 ─302

═══════════════════════ KEYS ACTIVE ═══════════════════════
  <F> Help; Arrow keys; <Ctrl-F1> Security level; <F2> Detail Screen; <F3>
  Change Owner; <F6> View Recipe; <F7> Recipe Directory; <F8> Event Log; <F11>
  Data Capture; <Ctrl-F12> End Program.
```

FIG. 3

```
═ 1: FSI_1 ═══════════ DETAIL SCREEN ═══════ 09-07-94 11:12:24 ══
400─ Recipe: FSI3/EEX/NDO(55); Step time=29sec; Time remaining=24:14
  Step: 16                                    ┌─ PERCENT DEVIATION ─┐
  CHEMICAL   MAX   UNITS   SET PT   READ OUT   VALUE   -4  -2  0  2  4  ─404

HF         500   cc/m    0        0          off
  NH4OH      500   cc/m    0        0          off
  HCL        500   cc/m    0        0          off
  H202       500   cc/m    125      54         off DI         500   cc/m    1250     1277       ON
                      PARAMETERS                        DEVIATION IN RPM
  RPM        600   rpm     20       20
  Hot H2O     0    deg-C   90       88                  ┌──────────────┐
  Etch Probe  0    deg-C   0        0                   │ Run Count  23│
  Analog1     0            0        0                   │ Washdown   90│
  Analog2     0            0        0                   └──────────────┘
  INPUTS:  00000000                      ACTIVE ALARMS:      408
  PROCESS: 16 030 0020 22,31,100,250,43
══════════════════════ KEYS ACTIVE ═══════════════════════
  <F1> Help; <F2> Toggle Graph; <F3> Change Capture Rate; <F4> Down Load; <F6>
  View Recipe; <F9> Reset Counter; <F11> STOP or VIEW Data Capture; <Esc> Exit.
```

FIG. 4

| = 1: FSL_1 ======== VIEW RECIPE ======== 09-07-94 11:19:24 = |||||
|---|---|---|---|---|
| Step | Sec | Rpm | Output functions | Recipe: WASHDOWN (2) |
| 00 | 140 | 0020 | 9=100,9,31,34,37,43,47<br>Set Blanket Heater to 100%<br>Enable Blanket Heater at 100%<br>Enable Lo Atomization<br>Enable Cold Chamber Rinse<br>Enable Cold Line Rinse<br>Enable By-pass Shut off<br>Enable Cold Wafer Rinse | |
| 01 | 040 | 0020 | 9,31,36,38,48,45<br>Enable Blanket Heater at 100%<br>Enable Lo Atomization<br>Enable Chamber Dry<br>Enable Hot Line Rinse<br>Enable Hot Wafer Rinse<br>Enable Plenum Rinse | |
| 02 | 015 | 0020 | 9,21,31,36,46<br>Enable Blanket Heater at 100%<br>Enable Solution Line Purge<br>Enable Lo Atomization<br>Enable Chamber Dry | |

======= KEYS ACTIVE =======
<F1> Help; Arrow keys; <Alt-P> Print recipe; <Esc> Exit.

FIG. 5
212

| =1: FSL_1========= ACTIVE ALARMS ========= 09-07-94 11:20:28 = ||||
|---|---|---|---|
| ALARM | STEP | TIME | DESCRIPTION — Recipe: FSI3/EEX/NDO |
| 16 | 16 | 24:14 | Motor Speed Error Alarm |

======= KEYS ACTIVE =======
<F1> Help; <F6> Pre Alarm Status; <F7> Clear Alarms; <Esc> Exit.

FIG. 6
228

```
═ 1: FSI_1 ═══════ PRE-ALARM DETAIL SCREEN ═══ 09-07-94 11:21:59 ═
Processor FSI_1 is idle.
Step: 0
```

| CHEMICAL | MAX | UNITS | SET PT | READ OUT | VALUE |
|---|---|---|---|---|---|
| HF | 500 | cc/m | 0 | 0 | off |
| NH4OH | 500 | cc/m | 0 | 0 | off |
| HCL | 500 | cc/m | 0 | 0 | off |
| H2O2 | 500 | cc/m | 0 | 0 | off |
| DI | 500 | cc/m | 0 | 0 | off |

PERCENT FULL SCALE
0  20  40  60  80  100

RPM % FULL SCALE

PARAMETERS

| | | | | |
|---|---|---|---|---|
| RPM | 600 | rpm | 0 | 0 |
| Hot H2O | 0 | deg-C | 0 | 0 |
| Etch Probe | 0 | deg-C | 0 | 0 |
| Analog1 | 0 | | 0 | 0 |
| Analog2 | 0 | | 0 | 0 |

Run Count  0
Washdown   0

INPUTS: 00000000                ACTIVE ALARMS:
PROCESS:

═══════════════ KEYS ACTIVE ═══════════════
<F1> Help; <Esc> Exit.

*FIG. 7*
230

═1: FSI_1═══════PRODUCTION RECIPE DIRECTORY═══ 11-03-94 11:48:33 ═

| RECIPE | RECIPE NAME | DATE/TIME | COMMENTS |
|---|---|---|---|
| 1 | 1-STANDBY | 11-03-94  11:45 | MODIFIED STEP 4 |
| 2 | WASHDOWN | 11-03-94  11:45 | |
| 3 | HF10/1-RCA | 11-03-94  11:46 | |
| 6 | NS8KIX-10/1-RCA | 11-03-94  11:47 | |
| 7 | PALGTO-10/1RCA | 11-03-94  11:46 | |

═══════════════ KEYS ACTIVE ═══════════════
<F1> Help; <F5> Edit Recipe Directory; <F6> View Recipe; <Alt-P> Print Recipe Directory; <PgUp> Previous; <PgDn> Next; <Esc> Exit.

*FIG. 8*
214

```
= 1: FSL_1 ============ VIEW EVENT LOG ========= 09-07-94 11:50:13 =
                              DATE              TIME
         Search from        (06/23/94)        09:40:01
         Search to           09/07/94         11:50:05

Flow System alarms (Y/N)  Y
         Recirculation System alarms (Y/N)  Y
         Generalized Digital Input alarms (Y/N)  Y
         DI Water Heater alarms (Y/N)  Y
         Other alarms (Y/N)  Y State change events (Y/N)  Y
         Recipe directory edit events (Y/N)  Y
         Recipe download/upload events (Y/N)  Y
         Include data capture events (Y/N)  Y Include recipe number (0=all)  0

========================= KEYS ACTIVE =========================
<F1> Help; Arrow keys; <F8> Search Event Log.
```

↗ 216  *FIG. 9*

```
= 1: FSL_1 ========= DATA CAPTURE INFORMATION ===== 09-07-94 11:53:08 =

1 FSL_1    data being captured to 0370901.055,  264 records written

========================= KEYS ACTIVE =========================
<F1> Help; <F7> Delete Files; <F10> Capture Search; <F11> Data Capture.
```

↗ 218  *FIG. 10*

```
==1: FSI_1========== ADD OR REPLACE A RECIPE ==== 09-07-94 11:46:02 ==
```

| HF10/1-RCA | NS8FOX-10/1-RCA | PALFOX-10/1-RCA |
| NS8KIX-10/1-RCA | HF10/1-RCA-* | CS21NW1-10/1-RCA |
| CS21FOX-10/1-RCA | CS21KIX-10/1-RCA | CS21GTO-10/1-RCA |
| PALKIX-10/1-RCA | WASHDOWN | NS8GTO-10/1-RCA |
| PALGTO-10/1-RCA | HF50/1-RCA-* | HF50/1 |
| HF100/1 | HCL/H2O2-TEST | PAL-TUNNELOX |
| 1-STANDBY | HF10/1-49%-BLEND | NS8IPDP-50/1-RCA |
| TEST-PH1 | TEST-PM2 | TEST-PH3 |
| TEST-HCL | TEST-TT | TEST-34*CH-RINSE |
| NS11FOX-10/1-RCA | NS8IMX-10/1-RCA | WASHDOWN2 |
| SHUTDOWNT | TESTRCA2 | PARTICLE.TEST |
| TEST*PH4 | NS8-NST-10/1 | PAL-NST-10/1 |
| CS21-NST-10/1 | TEST-H2O2 | NS8IOX-10/1-RCA |
| NS8I-PDP-RCA | NH4OH/H2O2-TEST | NS8BRO-10/1-RCA |
| EEXBRO-10/1-RCA | POST-NDO-10/1 | TEST34 |
| TEST-NH4OH | EENDO-10/1-RCA | KEIOX-10/1-RCA |
| TEST-HF | | |

248

```
============================ KEYS ACTIVE ============================
<F1> Help; Arrow keys; <Ent> to Accept; <Esc> Exit.
```

FIG. 11

```
= 1: FSI_1 ======= VIEW EVENT LOG, Page 1 ======= 09-07-94 11:52:06 =
```

| DATE | TIME | FSI# | REC | MESSAGE |
|------|------|------|-----|---------|
| 06-23-94 | 09:51:25 | | | FSIHost program version 1.10 started |
| 06-23-94 | 09:51:27 | 0 | | Event reporting enabled |
| 06-23-94 | 09:52:32 | 42 | | General Operator Request |
| 06-23-94 | 09:52:33 | 43 | | Operator Start Request |
| 06-23-94 | 09:52:33 | 31 | | General State Transition |
| 06-23-94 | 09:52:34 | 32 | | Idle to Setup Transition |
| 06-23-94 | 09:52:37 | 8 | | General Command Terminated |
| 06-23-94 | 09:52:38 | 2 | | Start Terminated |
| 06-23-94 | 09:52:38 | 31 | | General State Transition |
| 06-23-94 | 09:52:38 | 14 | | Processing Started (Setup to Executing) |
| 06-23-94 | 09:52:40 | | | Data capture started at new data |
| 06-23-94 | 09:52:40 | | | rate=3 second (s) |
| 06-23-94 | 09:53:39 | | | Step change from 2 to 3 |
| 06-23-94 | 09:54:39 | | | Step change from 3 to 4 |
| 06-23-94 | 09:56:09 | | | Step change from 4 to 5 |
| 06-23-94 | 09:56:29 | | | Step change from 5 to 6 |
| 06-23-94 | 09:56:59 | | | Step change from 6 to 7 |
| 06-23-94 | 09:57:19 | | | Step change from 7 to 8 |
| 06-23-94 | 09:57:51 | | | Step change from 8 to 9 |
| 06-23-94 | 09:58:09 | | | Step change from 9 to 10 |

250

```
=============================== KEYS ACTIVE ===============================
<F1> Help; <End> Last Page; <PgDn> Next; <Esc> Exit.
```

FIG. 12

```
═══════════════ DATA CAPTURE FILE SEARCH ═══════════════

Enter information below to narrow the search of
                    data capture fields.

Bank : (01)

Month : ('')

Day : ('')

Seq : ('')

Recipe : ('''')

═══════════════════ KEYS ACTIVE ═══════════════════
<F1> Help; <F11> Data Capture Graph; <Esc> Exit.
```

```
═1: FSL_1═══════ DATA CAPTURE FILE SEARCH ═══ 09-07-94 12:09:45 ═
┌─────────────────────┬─────────────────────┬─────────────────────┐
│ 0140601.054 04-06-94│ 0140601.055 04-06-94│ 0140701.034 04-07-94│
│ 0140701.005 04-07-94│ 0140701.006 04-07-94│ 0140701.007 04-07-94│
└─────────────────────┴─────────────────────┴─────────────────────┘

═══════════════════ KEYS ACTIVE ═══════════════════
<F1> Help; Arrow keys; <Ent> to Accept; <Esc> Exit.
```

SYSTEM FOR PROVIDING INTEGRATED MONITORING, CONTROL AND DIAGNOSTICS FUNCTIONS FOR SEMICONDUCTOR SPRAY PROCESS TOOLS

TECHNICAL FIELD

The invention relates generally to wet chemical spray process tools employed in the manufacture of integrated circuit ("IC") chips and, more particularly, to a system for providing integrated monitoring, control and diagnostics functions in connection with such tools.

BACKGROUND OF THE INVENTION

The etching of oxide layers or films on the surface of semiconductor wafers is an important aspect of the manufacture of IC chips. Much of such wafer processing is performed using a wet etching process in which combinations of liquid acids and other chemicals and deionized ("DI") water and DI water alone are alternately sprayed onto wafers respectively to etch, clean and rinse the wafers. In addition, the wafers are periodically sprayed with nitrogen gas for drying the wafers. Typically, each wafer is confined in a wafer carrier made of a suitable acid-resistant material. One or more such wafer carriers are carried on a variable speed turntable or rotor in a closed bowl of a spray process tool, which tool may be programmed with respect to certain phases of its operation, including the rotational speed of the rotor, the order in which the liquid chemicals, DI water, and nitrogen gas are applied to the wafers and the temperature of the chemicals and DI water.

One such spray process tool is the MERCURY® MP, which is commercially available from FSI International, Chaska, Minn. The MERCURY® MP is a multi-cassette spray tool that can be configured to perform a variety of semiconductor wet chemical processing operations, including resist removal and prediffusion cleans using a combination of sulfuric acid and hydrogen peroxide (SPM clean), oxide etching using hydroflouride/DI water ("HF/DI") mixtures, and variations on the conventional RCA clean developed by RCA Corporation, Princeton, N.J.

The technology underlying semiconductor spray process tools has attracted increased attention over the last several years, resulting in substantial refinement thereof. However, despite the significant advances made in this area, many of the spray process tools that are currently commercially available suffer certain striking deficiencies. In particular, such tools lack advanced process data monitoring capabilities, such as the ability to provide historical parametric data in a user-friendly format, as well as event logging, real-time graphical display of both current and the entire run's process parameters, and remote, i.e., local site and worldwide, monitoring. These deficiencies can engender nonoptimal control of critical process parameters, such as chemical flow rate accuracy, stability and repeatability, process temperatures and mechanical tool parameters. This variability manifests itself as within-run, run-to-run and tool-to-tool disparities that can propagate into deviations in product quality and performance, whereas an ideal monitoring and diagnostics system for such tools would provide a means of monitoring this variability, as well as providing means for optimizing control of critical parameters.

Another disadvantage suffered by currently available tools is that they have a limited display, typically capable of displaying only a few lines of information, thereby limiting the utility thereof Therefore, what is needed is a system for providing integrated monitoring, control and diagnostics functions for use with semiconductor spray process tools.

SUMMARY OF THE INVENTION

The foregoing problems are solved and a technical advance is achieved by method and apparatus for providing integrated monitoring, control and diagnostics functions for semiconductor spray tools. In a departure from the art, a spray processor host system of the present invention enables operators to use, monitor and maintain spray process tools.

In a preferred embodiment, the spray processor host system of the present invention comprises a plurality of PC-class computers interconnected via an Ethernet or other appropriate network link. Each of a first subset of the spray processor host system computers is adapted to perform as a supervisor computer. Each supervisor computer is connected to one of a plurality of spray process tools, which in the preferred embodiment comprise MERCURY® MP processors, for communicating therewith.

Each of a second subset of the spray processor host system computers comprises an engineer computer for providing a system operator with a command driven interface to the spray processer host system. Each engineer computer can monitor a plurality of supervisor computers and is used to enable such functions as recipe directory editing, recipe downloading, event log searching, data capture file data graphing and processor status viewing. These functions can also be performed from each supervisor for the particular processor connected thereto.

A third subset of the spray processor host system computers comprises one or more bridge computers for providing a communications link between the supervisor computers and a upstream host computer outside the spray processor host system, for example, a lot scheduling or material flow control computer. In the presently preferred embodiment, each supervisor computer includes the functionality of a bridge computer, although a separate bridge computer may be provided for providing a communications link between several supervisor computers and the upstream host computer.

In operation, each of the supervisor computers provides ongoing information exchange with its respective processor and maintains up-to-date processor status information for access by other computers on the network. In particular, each supervisor computer maintains an event log of processor operations and operator actions, as well as data capture files for storing process variables by the supervisor computer. An engineer computer may be used to access the event logs and data capture files for any of the supervisor computers connected thereto for display in one of several user selected formats. In particular, the data stored in the data capture files may be displayed as graphs of operator-selected parameters, such as chemical flow rates, turntable rpm and temperature, by a system operator using one of the engineer computers. This data may be used, for example, in optimizing flow stabilization algorithms and procedures that control chemical ratios, developing machine operating protocols that insure the proper process temperature for optimal performance and device yield, detection of deteriorating equipment performance indicative of imminent equipment failure, and equipment failure analysis of system aborts, alerts or alarms.

In addition, the operator is provided with the ability to acknowledge alarms, as well as add and delete recipes and select recipes to be downloaded to a processor, using the engineer or supervisor computer, at which point, the appropriate supervisor computer performs the requested function.

Moreover, connection of the spray processor host system to a VAX or other SECS-compatible system via an Ethernet network enables the above-described functions to be performed remotely, i.e., from local sites and worldwide.

In one aspect of the invention, data capture files stored on hard drives of the supervisor computers are periodically automatically uploaded to a large hard drive of an archive computer and deleted from the hard drives of the individual supervisor computers, thereby increasing the number of data capture files that may be stored on the system as well as the amount of time such files may be stored.

A technical advantage achieved with the invention is that it provides an easily accessible database in which a log of process events may be stored and subsequently retrieved.

Another technical advantage achieved with the invention is that it enables remote monitoring and analysis from on-site and off-site location.

Another technical advantage achieved with the invention is that it enables an operator to monitor the real-time status of all critical parameters, including chemical flow, process temperature, turntable speed, recipe progress, runtime, process steps and alarms.

Another technical advantage achieved with the invention is that it provides enhanced recipe features, including the storage of recipes on a hard drive, rather than on floppy disks, the display of multiple steps of a recipe at a time, and the automation of recipe selection.

Another technical advantage achieved with the invention is that it enables the remote acknowledgement of alarms.

Yet another technical advantage achieved with the invention is that it enables full event logging, such that keys pressed and functions performed by the tool may be reviewed at any given time.

Still another technical advantage achieved with the invention is that it enables chemical flow rate, temperature, turntable speed, and other data to be collected and plotted in graphical form in real time on the display of a computer associated with the tool.

Still another technical advantage achieved with the invention is that it effectively provides each processor with a full screen display, rather than the small display typically provided on the spray processor.

BRIEF DESCRIPTION OF THE DRAWINGS

FIG. 3 illustrates a system status screen of the spray processor host system of the present invention.

FIG. 4 illustrates a detail screen of the spray processor host system of the present invention.

FIG. 5 illustrates a view recipe screen of the spray processor host system of the present invention.

FIG. 6 illustrates an active alarms screen of the spray processor host system of the present invention.

FIG. 7 illustrates a pre-alarm detail screen of the spray processor host system of the present invention.

FIG. 8 illustrates a recipe directory screen of the spray processor host system of the present invention.

FIG. 9 illustrates an event log setup screen of the spray processor host system of the present invention.

FIG. 10 illustrates a data capture status screen of the spray processor host system of the present invention.

FIG. 11 illustrates an add or replace a recipe screen of the spray processor host system of the present invention.

FIG. 12 illustrates a view event log screen of the spray processor host system of the present invention.

FIG. 13 illustrates a data capture search screen of the spray processor host system of the present invention.

FIG. 14 illustrates a list of files screen of the spray processor host system of the present invention.

DESCRIPTION OF THE PREFERRED EMBODIMENTS

Figure 1A:
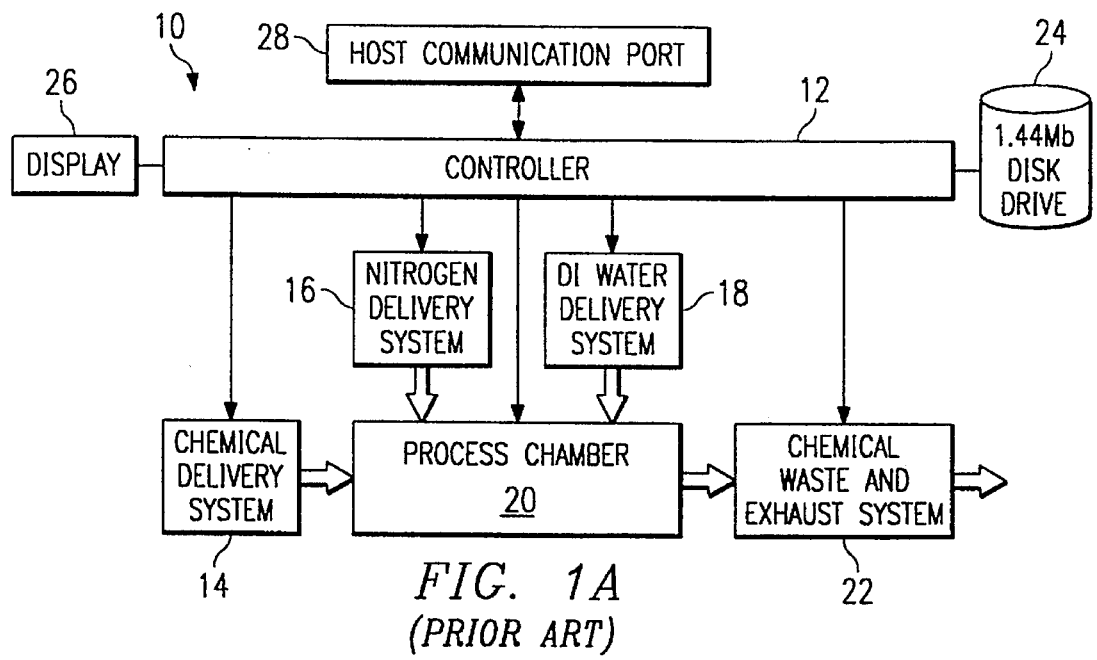
FIG. 1A is system block diagram of a conventional spray process tool.

FIG. 1A is a system block diagram of a conventional spray process tool (processor) 10, which in a preferred embodiment is a MERCURY® MP available from FSI International, for processing semiconductor wafers in the manufacture of IC chips. As shown in FIG. 1A, a controller 12 is electrically connected to a chemical delivery system 14, a nitrogen delivery system 16 and a DI water delivery system 18 for controlling the flow rate of the delivery of chemicals, nitrogen, and DI water from the chemical, nitrogen and DI water delivery systems 14, 16 and 18, respectively, to the process chamber 20 for etching, drying and cleaning wafers (not shown) disposed on a turntable (not shown) within the process chamber 20.

The controller 12 is further electrically connected to the process chamber 20 for controlling the rotational speed of the turntable disposed therein. Chemical waste from the process chamber 20 is disposed through the chemical waste and exhaust system 22, the operation of which is also controlled by the controller 12.

As is well known in the art, recipes for controlling various aspects of the operation of the processor, including, for example, chemical flow rate and temperature and turntable speed, are stored on floppy disks and input to the processor 10 via a 1.44 MB floppy disk drive 24. A particular recipe may be selected for implementation by the controller 12 in a known manner. The processor 10 further comprises a small display 26 for displaying, for example, a indication of the recipe step currently being executed.

For purposes that will subsequently be described in detail, access to control signals and other data generated by or communicated to the controller 12 may be had via a host communication port 28 electrically connected to the controller 12. In view of the fact that the operation of the processor above, is well known in the art, such operation will not be further described in detail.

Figure 1B:
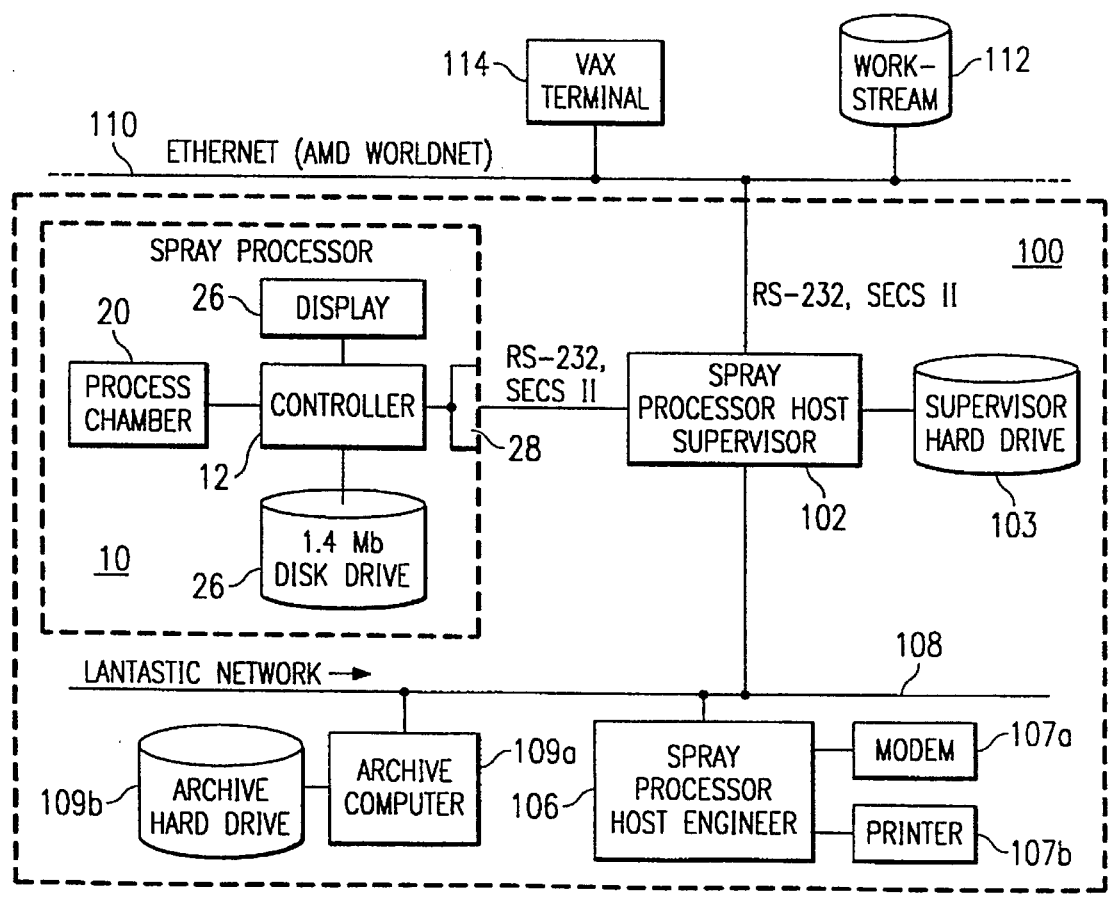
FIG. 1B is a block diagram of the preferred embodiment of the spray processor host system of the present invention.

FIG. 1B is a system block diagram of a preferred embodiment of the spray processor host system 100 of the present invention. As shown in FIG. 1B, the system 100 includes one or more supervisor computers, collectively represented in FIG. 1 by a single supervisor computer 102. The COM1 port of each supervisor computer 102 is electrically connected to a spray process tool, such as the processor 10 shown in FIG. 1A, via a standard RS-232 port connection, for communicating therewith using Gem compatible SECS II protocol. In particular, as will subsequently be described in greater detail, during each process run of the processor 10, event data and operating parameters are written to a data capture file corresponding to that process run and stored on a hard drive 103 of the supervisor computer 102 connected thereto. Recipes for implementation by the processor 10 are also stored on the hard drive 103, from which they may be downloaded to the processor 10, as will be described. In this manner, the recipes may be stored in a much more permanent manner than previously used, i.e., floppy disks.

The system 100 further includes at least one engineer computer 106, comprising a modem 107a and connected to a printer 107b, for monitoring a plurality of supervisor computers, such as the supervisor computer 102. In the presently preferred embodiment, the engineer can effectively monitor up to eight such supervisor computers. The engineer computer 106 is electrically connected to the supervisor computer(s) 102 via a local area network 108, which in the preferred embodiment comprises a Lantastic network. In this regard, it should be understood that both the supervisor computer(s) 102 and the engineer computer 106 include appropriate hardware, specifically, compatible network cards, for connecting to the network 108. The engineer computer 106 provides an interface to spray processor host system operators and, as will subsequently be described in detail, initiation of recipe directory editing, recipe downloads, event log searching, data capture graphs, processor status viewing and other functions are controlled using the engineer computer 106. Such functions may also be performed directly from the supervisor computer 102. Remote connection to the engineer computer 106 via the modem 107a enables the system 100 to be controlled and monitored from an off-site location. It should be noted that the engineer computer 106 need not be a "dedicated" spray processor host system 100 computer and may in fact be used to perform additional tasks not associated with the system 100.

As previously indicated, during each process run of the processor 10, event data and operational parameters are captured in a data capture file associated with the particular run and stored on the hard drive 103 of the supervisor computer 102. In view of the fact that there will typically be five or six process runs a day, each resulting in the generation of a data capture file hundreds of kilobytes to more than a megabyte in size, depending on the data capture rate and process run time, typical PC hard drive, such as the hard drive 103, will be incapable of storing more than a few weeks worth of process data. In most instances, this will be insufficient to ensure that historic data is no longer needed before it will need to be deleted to free up space for new data.

As a solution to this problem, an archive computer 109a and associated archive disk drive 109b are provided on the network 108 for "archiving" data capture files for longer periods of time. In the preferred embodiment, the data capture disk drive 109b comprises five hard drives each having 800 to 900 MB of disk space, i.e., enough space to store approximately three months worth of data capture files, thereby increasing the likelihood that capture data will not have to be deleted until it is no longer needed. Moreover, because the capture disk drive 109b i is networked, it is accessible by any computer in the spray processor host system 100. In accordance with a feature of the present invention, the archive computer 109a periodically (e.g., every ten days) copies data capture files stored on transmitted to the supervisor computer 102, via path 152, workstream database 112 and path 154, which forwards them for execution by the spray processor 10 via path 156. The spray processor 10 constantly transmits equipment status and process data to the supervisor computer 102, as indicated by a path 158, which data is transmitted to the supervisor hard drive 103, as indicated by a path 160, for storage in data files. Equipment status and real time data from the spray processor 10 are also transmitted to the engineering computer 106, as indicated by a path 162, and equipment status data is transmitted to the VAX terminal 114 via the workstream database 112, as indicated by paths 164, 166. The data files comprising equipment status and process data from the spray processor 10 and stored on the supervisor hard drive 103 are periodically uploaded to the archive hard drive 109b via the archive computer 109a, as indicated by paths 168 and 169, from which they may be accessed by the engineering computer 106, as indicated by a path 170. Equipment status and historical data stored on the supervisor hard drive 103 may be subsequently accessed for use by the supervisor computer 102 via the path 155.

As previously indicated, on each computer is stored a configuration file unique to the particular computer and, if the computer is a supervisor, the processor to which it is connected. The configuration file, designated #CONFIG-.FSI, is read at startup of the spray processor host system to determine the functionality of the computer, i.e., supervisor, engineer, bridge, or any combination thereof. As will be described in greater detail with reference to FIGS. 17 and 18, the use of a configuration file such as that described below enables a single software utility program comprising separate modules for implementing the functionality of each of the three types of computers to be run on all of the computers in the system 100, with the functionality of the particular computer being determined by its configuration file. In other words, one purpose of the configuration file is to specify which of the three modules of the software utility the computer is to run. each supervisor's hard drive to the archive hard drive 109b, after which the copied data capture files are deleted from the supervisor hard disk drive. In order to prevent data capture files to which data is currently being added from being deleted during this periodic archiving process, in one aspect of the invention, the most recent two days worth of data capture files are not copied to the archive hard drive 109b and hence are not deleted from the supervisor hard drives. In this manner, data capture files may be automatically, as well as manually, archived. In addition, other files stored on the supervisor hard drives, such as individual configuration, recipe and other system files, are also copied to the archive disk drive 109b during the periodic archiving process, thereby preventing such information from being lost should a supervisor computer fail during operation of the system 100.

A bridge computer, which in the illustrated embodiment comprises the same computer as the supervisor computer 102, provides a communication bridge between the spray processor host system 100 and an upstream host computer outside the spray processor host system 100, such as a lot scheduling or a material flow control computer (not shown), via an RS-232/SECS II connection from the COM2 port thereof to a second, proprietary network 110, which in the preferred embodiment comprises an Ethernet network. Such a connection enables communication and interaction between the spray processor host system 100 and a manufacturing execution system (MES) 112, which in the preferred embodiment comprises the Workstream MES available from Consilium, Inc., of Mountain View, Calif. In addition, as will be further described in detail, such a connection enables remote access to the spray processor host system 100 from any VAX terminal 114 on the network 110. In the presently preferred embodiment, each supervisor computer, such as the computer 102, also includes the functionality of a bridge computer; however, it would be possible to implement the system 100 using a single bridge computer for providing a communications link for more than one supervisor computer.

In the preferred embodiment, each supervisor computer 102 comprises a 486DX PC having at least a 120 Mb hard drive (FIG. 1B, 103) and a 3½ inch floppy drive (not shown). Each supervisor computer 102 is responsible for providing ongoing information exchange with its associated processor 10, as well as maintaining up-to-date controller status for the other computers on the network to access. In addition, each supervisor computer 102 performs functions for engineer and bridge computers on the network, such as recipe downloading handling, event reporting and alarm handling, maintains an event log of processor 10 operations and operator actions, and captures and stores process variables in data capture files for each process run. In the multiple computer environment shown in FIG. 1B, the supervisor computer 102 need not include its own keyboard or display.

The engineer computer 106 provides the system operator with access to status information for up to eight supervisor computers, as well as to parametric data, and various other files on any of the supervisor computers on the network. In addition, the engineer computer provides operator interface functions, such as recipe directory editing, system status information, initiating recipe download, event log searching, alarm clearing, and the graphing of data capture files.

The bridge computer, which in the illustrated embodiment comprises supervisor computer 102, is responsible for sending event messages, including alarm messages, to an upstream host system connected to the network 110, receiving and processing messages, such as recipe download and alarm clear, from the upstream host, and synchronizing the network clocks with the upstream host.

Figure 1C:
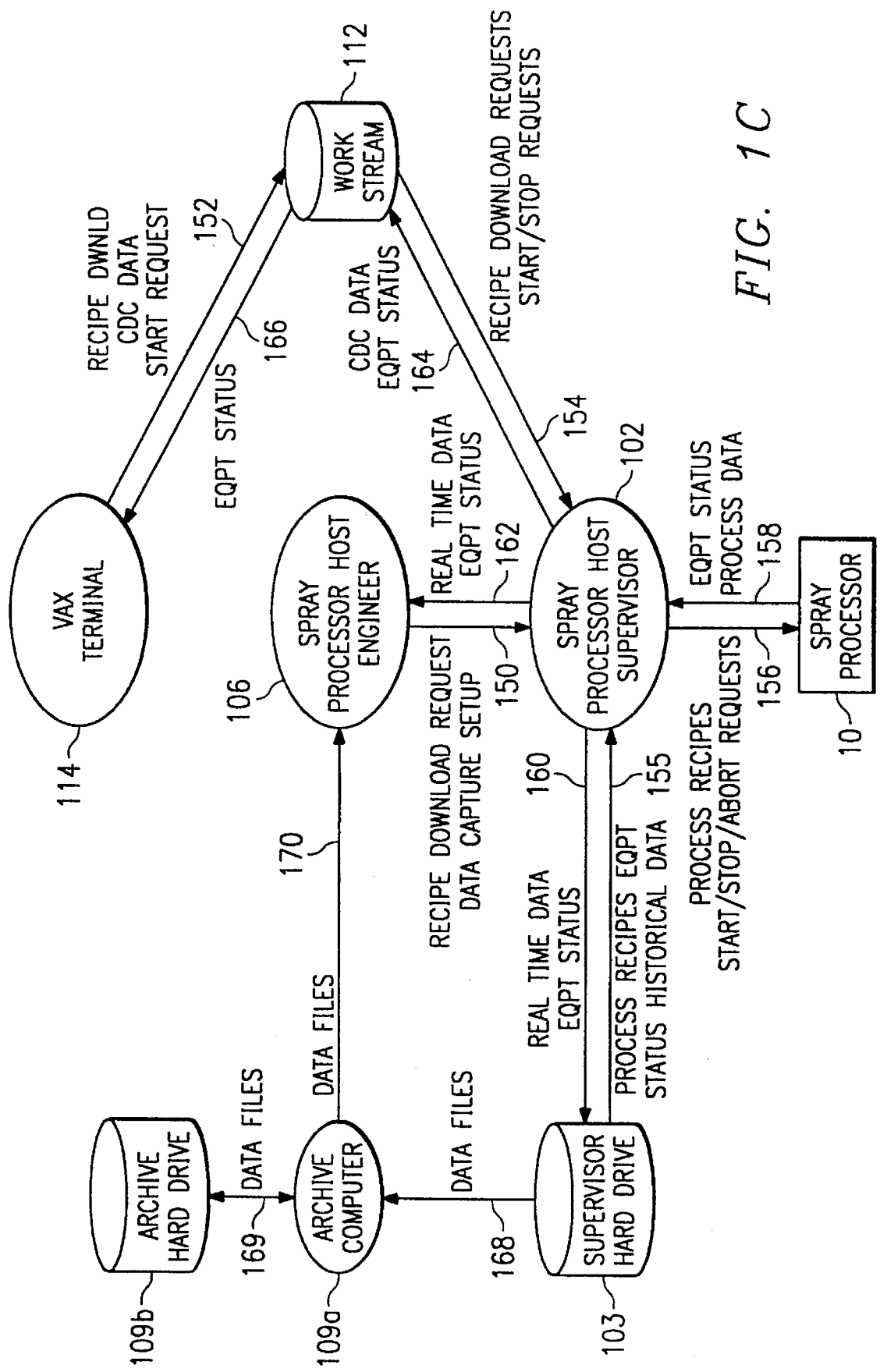
FIG. 1C is a flow diagram of data flow within the spray processor host system of the present invention.

FIG. 1C illustrates the information flow of the system of FIG. 1B. Recipe download requests are transmitted to the supervisor computer 102 either directly from the engineering computer 106, as indicated by a path 150, or indirectly from the VAX terminal 114 via the workstream database 112, as indicated by paths 152, 154, for causing the supervisor computer 102 to download process recipes from the supervisor hard drive 103 to the spray processor 10, as indicated by paths 155 and 156. Start and abort requests from the VAX terminal 114 are also In the presently preferred embodiment, #CONFIG.FSI may be edited using any number of available editors and any characters to the right of an asterisk ("*") are read as comments. As shown below, the #CONFIG.FSI file begins with comments giving restrictions on the length of certain names and other information concerning the use of the file.

```
*   GENERAL NOTES:
*       1. All characters after the first * on a line are assumed to
*          be part of a comment and are ignored.
*       2. Commas are used to separate similar entries on one line.
*       3. The processor name is limited to 10 characters.
```

Next is a "NETWORK" section pertaining to the computer network, including information regarding the number of computers in the network (1 to 20), information about each computer, the computer on which backup copies of recipes are to be stored, the computer that has a printer, such as the printer 107b, for printing recipes, and the number of the computer being used as a message router to an external host (usually the bridge computer). An exemplary NETWORK section is shown below.

```
NETWORK    *

1           *Number of computers on the network (1 to 20)
*               The first computer in the following list is the computer in
*               which this configuration file is to be installed.
*   COMPUTER    Number assigned to each computer on this
*   NUMBER:     network.
*               The first computer listed is the local
*               computer.
*   COMPUTER    A 10 character name assigned to the
*   NAME:       computer as an identifier. This name is
*               also the network node name.
*               The computer name cannot contain spaces.
*   Equipment ID
*   HOST COMPUTER:  Enter 'Equipment Id' number
*   or
*   ENGINEERING:    Enter a '0'

*   COMPUTER    |   COMPUTER NAME    |   Equipment Id
*   NUMBER      |   (10 Characters max)  |   (sent upstream)

1                   , Sb1                   , 1 *Supervisor
    0           *   Computer number on which to store backup copes of
*                   recipes
*                   (Ignored if there is only one computer in the list.)
    0           *   Computer number which has the printer for printing
*                   recipes.
*                   ('0' if there is no printer.)
    0           *   Computer number which is used as a bridge from 1–8
*                   processors to an upstream host
```

As shown below, a "DATA CAPTURE" section pertains to data capture and includes information for identifying the data capture disk and directory, the amount of disk space on the data capture disk that cannot be used for data capture, the rate of data capture saves to the disk, in seconds, a keyword "ARCHIVE," and the archive directory path. In particular, the data capture rate allows the user to determine the frequency with which data is "captured" from each processor, thereby determining the resolution of graphs to be created using the system 100, as the smaller the data capture rate (in seconds) specified, the more accurate the graph. A typical data capture rate is 2 to 3 seconds.

```
DATA CAPTURE       * d:544 fsicap   *   data capture disk and directory
```

-continued

| | | | |
|---|---|---|---|
| 500 | * | Amount of disk space on data capture disk which cannot be used for data capture, in kilo-bytes. | |
| * | | | |
| * | | | |
| 03 | * | rate of data capture in seconds (01 to 59) | |
| * | | | |
| ARCHIVE | * | Keyword indicating that an archive storage computer for data capture files exists. | |
| * | | | |
| * | | | |
| 544 544 PC_BACKUP544 a544 CAPTURE | | * Archive directory path | |
| * | | | |
| * | | 544 544 computer name544 disk:544 | |
| * | | directory | |

Next, as shown below, a "COMMUNICATIONS" section pertains to communication information; specifically, processor communication information, including baud rate (default 9600), parity (default N), data bits (default 8) and stop bits (default 1), and upstream host communication information, including baud rate (default 9600), parity (default N), data bits (default 8) and stop bits (default 1).

```
COMMUNICATIONS      *Keyword

*   ETCHER (Comm Port 1):
    9600  *  Baud rate (2400, 4800 or 9600)
    N     *  Parity (N, O, E)
    8     *  Data bits (7 or 8--Must be N parity if 8 data bits)
    1     *  Number of stop bits (1 or 2)

*   HOST
*   UPSTREAM COMPUTER (Comm Port 2):
    9600  *  Baud rate (2400, 4800 or 9600)
    N     *  Parity (N, O, E)
    8     *  Data bits (7 or 8--Must be N parity if 8 data bits)
    1     *  Number of stop bits (1 or 2)
```

As shown below, the next section, designated "PARAMETERS," pertains to flow system information and includes, for each chemical, the chemical name, chemical code number (as shown in FSI manuals), maximum range of the chemical flow and units in a table of seven chemical flows. In the preferred embodiment, flow system seven is designated as the DI water system.

| PARAMETERS | * | | | | | |
|---|---|---|---|---|---|---|
| * FLOW SYSTEM | | | | | | |
| * Number of Flow systems = 7 | | | | | | |
| * NAME | | | Chemical | RANGE | | Units |
| * (10 Chars) | | Code no. | (4 digits) | (4 char.) | | |
| H2SO4 | , | 220 | , | 1500 | , cc/m | *Flow 1 |
| HCL | , | 210 | , | 300 | , cc/m | *Flow 2 |
| HF | , | 400 | , | 1500 | , cc/m | *Flow 3 |
| NH4OH | , | 760 | , | 300 | , cc/m | *Flow 4 |
| H2O2 | , | 250 | , | 300 | , cc/m | *Flow 5 |
| | | | | | | *Flow 6 |
| DIMix | , | 100 | , | 1500 | , cc/m | *Flow 7 |
| * | | | | | | (7 always DI) |

As shown below, the next section comprises a table of up to five other parameters monitored by the system, including parameter name, parameter maximum and parameter units. The parameters occupy fixed positions in the table and include RPM (turntable RPM), Hot H20 (hot water temperature), Etch Probe (etch probe/spray post temperature), Analog-1 (spare system input) and Analog-2 (spare system input). A blank in the parameter name entry indicates that the parameter corresponding to that position in the table is not used.

| * PARAMETERS | The five parameters will be reported unless left blank in this table. | | |
|---|---|---|---|
| * NAME | | RANGE | Units |
| * (10 Characters) | | (4 digits) | (4 characters) |
| RPM | , | 550 | , rpm *Turntable speed |
| Hot H2O | , | 140 | , deg-C. *Hot H2O temp |
| Etch Probe | , | 140 | , deg-C. *Spraypost temp |
| Analog-1 | , | | , *Analog Input |
| Analog-2 | , | | , *Analog Input |

Finally, as shown below a digital input section comprises INPUTS, which are digital inputs up to 6, and the numbers of the inputs to be monitored.

```
INPUTS  *  There are up to 6 general purpose
  5 7 8 *3456 Digital inputs: List the ones used
*              END CONFIGURATION
```

Figure 2:
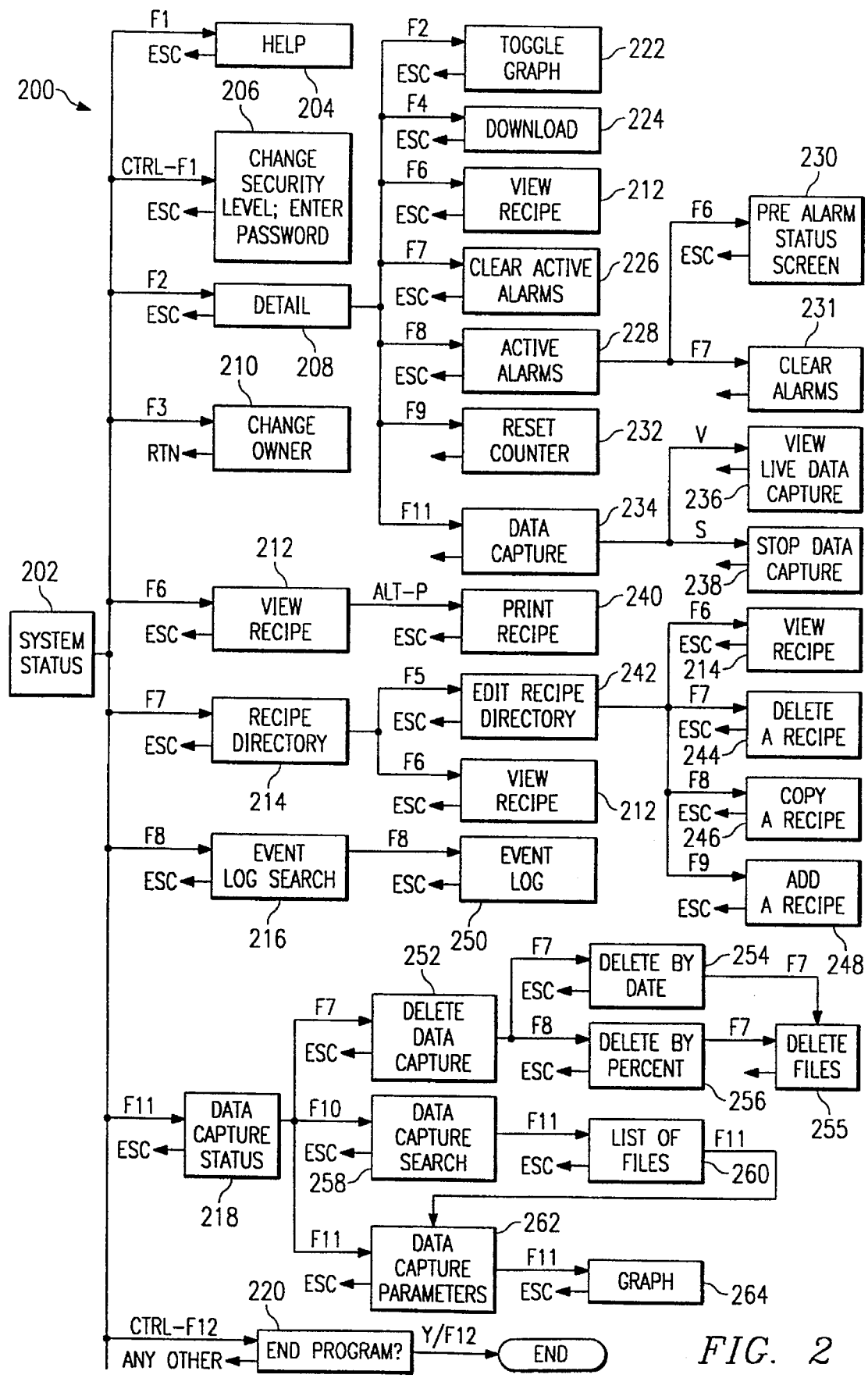
FIG. 2 is a flow diagram of the operator interface of the spray processor host system of the present invention.

FIG. 2 illustrates a flow diagram 200 of the operator interface of the spray processor host system 100, wherein a plurality of labeled boxes represent display screens and windows for presentation on a display of the engineer computer 106.

Upon initiation of the spray processor host system, a system status screen 202 is displayed on the display of the engineer computer 106. An exemplary system status screen is shown in FIG. 3. At this point, it should be noted that at the top of each spray processor host system screen, such as the system status screen 202 shown in FIG. 3, is a title line 300 which shows, from left to right, the name of the supervisor computer, in this case, "FSI_1," the screen title, in this case "FSIHOST SYSTEM STATUS," and the current date and time, in this case, "Sep. 9, 1994 10:57:53." At the bottom of each screen is a key definition section 302 labeled "KEYS ACTIVE." As its label suggests, the key definition section comprises a list of active keys for the screen, it being understood that the active keys will change with the screen, as well as with the current security level.

In addition, certain keys retain a particular function throughout all of the screens, including the arrow keys, which are used for moving from one entry field to another, <END> to go to the last page of a list of items, <ENTER> or <RETURN> to select information from a list or to finish entering data in an input field, <ESC> to exit from the current screen to the previous screen or system status screen 202, <PG DN> to view the next page of a list, <PG UP> to view the previous page of a list, <+> to select, or highlight, a particular entry from a list of entries, and <PRT SCRN> to print data capture graphs.

The system status screen 202 shows status information for each of up to eight processors/supervisor computers. Below the title line 300 is information about each processor 104, including the processor name in a field labeled "FSI", the recipe step being executed in a field labeled "STEP", the recipe number and name in a field labeled "RECIPE", the processor status in a field labeled "STATUS", the processor owner in a field labeled "OWNER", and the time of day at which execution of the current recipe will end in a field labeled "END TIME." The processor status will be listed as "IDLE" if the processor 1–4 is not performing any functions, "SETUP" if the processor 104 is getting ready to change to a new status, "EXECUTING" if the processor 104 is running a recipe, "BUSY" if the processor 104 is performing a task, such as autofilling canisters, "WASHDOWN" if an alarm condition exists, "PAUSE" if the processor 104 is attending to an alarm condition or if a manual function, such as opening or closing the lid, is being performed.

In the center of the screen 202 is a one-line status message 304 for the processor 104 whose name is highlighted above. The format of the status message 304 when the status of the highlighted processor 104 is EXECUTING is Recipe: recipe name (recipe number); Step time=sss sec; Time remaining=mm:ss.

Otherwise, the status message 304 will simply read processor name is status

Where processor name is the name of the highlighted processor and Status is the status thereof as listed above.

Referring to FIGS. 2 and 3, depression of <F1> from the system status screen 202 results in the generation of a help window 204 in which is displayed information regarding use of the spray processor host system. Depression of <CTRL> and <F1> simultaneously (hereinafter represented ("<CTRL-F1>") results in the display of a change security level window 206 for enabling the operator to change the security level of the system. Depression of <F2> results in the display of a detail screen 208 for the selected processor, as will be described in greater detail below with reference to FIG. 4. Depression of <F3> results in the generation of a change owner window 210 for enabling the operator to change the owner of the selected processor. Depression of <F6> results in the display of a view recipe screen 212, which is described in greater detail below with reference to FIG. 5. Depression of <F7> results in the display of a recipe directory screen 214, which is described in greater detail below with reference to FIG. 8. Depression of <F8> results in the display of an event log screen 216, which is described in greater detail below with reference to FIG. 9. Depression of <F11> results in the display of a data capture status screen 218, which is described in greater detail below with reference to FIG. 10. Finally, depression of <CTRL-F12> results in the display of an "End Program" window 220 for prompting the operator to input whether or not he or she actually wants to exit the spray processor host system. Depression of <Y> or <F12> terminations execution of the spray processor host system. Depression of any other key returns the operator to the system status screen 202.

FIG. 4 is an illustration of the detail screen 208. As shown in FIG. 4, the detail screen 208 shows process information for a selected processor. As described above, the detail screen is displayed by selecting a processor 104 from the system status screen 202 and then depressing <F2>. The information on the detail screen is updated periodically, for example, on the order of once every second, while a recipe is executing. Below the title line of the detail screen is a one lines status message 400, the format and content of which is similar to the status message 304 of the system status screen 200.

Below the status message 400 is the recipe step number currently being. executed, in this case, "16," and a chemicals table 402 showing current chemical flow information. The "CHEMICAL" column of the table 402 lists the process chemicals (up to eight), as specified in the particular supervisor's configuration file. The format and content of the configuration file has been described in detail above. The order and position of the chemicals in the table 402 is important because each position corresponds to a flow system. For example, the illustrated detail screen 208 lists DI in the seventh position, because it will be connected to the seventh flow system.

The "MAX" and "UNITS" columns together specify the maximum value allowed for each chemical. These values are specified by a system manager in an supervisor's configuration file. The "SET PT" column shows the output set point as specified in the active recipe and is an actual value, rather than a percentage. The "READ OUT" column shows the output value as reported by the processor 104 in the most recent data reading. Again, these are actual values, not percentages. The "VALVE" column shows whether the output flow is on or off.

A graph 404 next to the table 402 shows percent deviation or percent full scale for each chemical with an "ON" value. Pressing <F2> toggles between the two types of information. A Percent Deviation graph, shown in FIG. 4, shows the deviation between the setpoint and readout values, from −4 to +4 percent, thereby enabling quick identification of possible errors in the process run. A Percent Full Scale graph (not shown) shows the readout as a percentage of the maximum flow value in a format similar to that of the Percent Deviation graph.

Below the chemicals table 402 is a parameters table 406. As with the chemicals, each parameter is listed in the parameters table 406 with its maximum, units, setpoint and readout values. The spray processor host system supports the following parameters: RPM, which is the operator-defined name for turntable information, "Hot H20," which is the DI water heater temperature, "Etch Probe," which is the spray post temperature, and "Analog-1" and "Analog-2," which are operator-defined readings.

Below the graph 402, a box 408 shows values for "Run Count" and "Washdown." Run Count is the number of process runs since the last time the run count was cleared. This value is available from the processor 104 and can be used for scheduling maintenance. Washdown is the amount of washdown time necessary to recover from an alarm; that is, the amount of time it takes to halt the current process step and completely rinse the wafers in response to an alarm. Below the parameters table 406 are three more items of information, including "INPUTS," which is a string of eight s and/or 0s showing which inputs are on (1) and which inputs are off (0), "PROCESS," which indicates the current recipe step in terms of step number, step time, turntable speed and a list of active outputs, and "ACTIVE ALARMS," which lists the numbers of the active alarms, in red. Detailed alarm information is displayed on a separate alarms screen (FIG. 6).

From the detail screen 208, as previously described, pressing <F2> toggles the graph 402 between Percent Deviation and Percent Full Scale, as represented in FIG. 2 by a screen block 222. Once the graph 402 is toggled, the operator is automatically returned to the detail screen 208.

Pressing <F4> enables an operator to download a recipe from either of two libraries maintained by the spray processor host system on each of the supervisors, such as the supervisor 102, including a production library containing tested production recip engineering library, containing the test recipes. To download a recipe, the operator presses <F4> from the detail screen 208 to display a download window 224, at which point, the operator may press <P> or <RETURN> to download from the production library, or <E> and then <RETURN> to download a recipe from the engineering library. After choosing a library, the operator is prompted to enter the number of the recipe to be downloaded, at which point, the operator may return to the detail screen 208 by pressing <ESC>.

Pressing <F6> from the detail screen 208 results in the display of a View Recipe screen 212, which will be discussed in greater detail below with reference to FIG. 5. Pressing <F7> from the detail screen 208 clears any active alarms, as represented in FIG. 2 by a window block 226. Pressing <F8> from the detail screen 208 results in the display of an active alarms screen 228, as illustrated in greater detail in FIG. 6, it being understood that this option is only available when there is in fact an active alarm. From the active alarms screen 228, the operator may obtain information regarding the status of the processor 104 immediately prior to the alarm by pressing <F6>, which results in the display of a pre-alarm status screen 230, as illustrated in greater detail in FIG. 7, it being understood that this option is only available when there is in fact an active alarm. The pre-alarm detail screen comprises the contents of the detail screen 208 just before the alarm occurred. From the active alarms screen 228, pressing <F7> clears all active alarms, as represented in FIG>2 by a window block 231.

Pressing <F9> from the detail screen 208 resets the run counter, which keeps track of the number of process runs since the last reset thereof, to zero, as represented in FIG. 2 by a window block 232. Finally, pressing <F11> from the detail screen 208 results in the display of a data capture window 234 for enabling the operator to stop or start capture data and review captured data. From the data capture window 234, pressing <V> enables the operator to view the data being captured, as represented in FIG. 2 by a window block 236 and described in greater detail below, while pressing <S> enables the operator to stop data capture, as represented in FIG. 2 by a window block 238.

From the system status screen 202, depression of <F3> results in the display of the change owner window 210 for enabling the operator to change the owner of a selected processor. In the preferred embodiment, the available owners include "PROD" for production runs, "MAINT" for processor maintenance, "QUAL" for qualification testing, "ENG" for testing by engineering, and "RSVD" for reserved. To change the owner, the operator simply presses <+>until the desired owner is displayed, at which point, the operator presses <RETURN> to return to the system status screen 202.

Pressing <F6> from the system status screen 202 results in the operator being prompted to enter the number of the recipe to be viewed, it being noted that, as described below, if the number is not known, the operator may locate the number by pressing <F7> to use the recipe directory 214 (FIG. 8). Once a recipe number has been entered, the view recipe screen 212, which is illustrated in greater detail in FIG. 5, is displayed. As shown in FIG. 5, for each recipe step, the step number (0–99), step duration (in seconds), turntable RPM, and the output function numbers are specified. Below the numbers are the function descriptions in the same order as the numbers. As represented in FIG. 2 by a window block 240, the current recipe may be printed by pressing <ALT-P>.

Pressing <F7> from the system status screen 202 results in the operator being prompted to select either the production or engineering library, as discussed above. Once the appropriate library has been selected, the recipe directory screen 214, as illustrated in greater detail in FIG. 8, is displayed. The recipe directory screen 214 shows each recipe's number and name, the date and time when the entry therefor was created or changed, and possibly a comment. From the recipe directory screen 214, depression of <F5> enables the operator to edit the recipe directory screen 214, as represented by an edit recipe directory window block 242. At that point, the operator may press <F6> to view a recipe, as represented by the view recipe screen block 212, <F7> to delete a recipe, as represented by a delete a recipe window block 244, and <F8> to copy a recipe, as represented by a copy a recipe window block 246, it being understood that recipes to be viewed, deleted or copied are designated by the operator's entering the appropriate recipe number.

In addition, depression of <F9> results in the display of an add or replace a recipe screen 248, as shown in greater detail in FIG. 11. In a preferred embodiment, new recipes may be added to the system using a "MERCURY® Offline Editor" ("MOE") program provided by the manufacturer of Mercury processors to create and edit recipes for implementation therein. The MOE editor is used to create recipes because of its built-in safety checks. In operation, a floppy disk containing the recipes for a processor 10 is inserted into a computer (not shown) running the MOE program, at which point recipes may be edited or created in a known manner. In the prior art, the disk containing the recipes is used to input recipes directly to the processor 10. However, in accordance with a feature of the present invention, recipes for execution by the processor 10 are also stored on the hard drive 103 of the associated supervisor computer 102. Accordingly, after recipes are created or edited using the MOE, the disk containing the processor 10 recipes is inserted in the appropriate floppy drive (i.e., A: or B:) of the supervisor computer, and then <F9> is pressed. At that point, a list of all the recipes on the disk is displayed. To add a recipe, the selected recipe is highlighted using the arrow keys, at which point the operator may press <ENTER> to add the selected recipe. The operator is then prompted to enter a recipe number for the recipe. If the entered number is the same as an existing recipe, the operator is queried as to whether the existing recipe with the same recipe number is to be replaced. The new recipe is then copied to the recipe subdirectory and its name added to the recipe file.

From the system status screen 202, pressing <F8> results in the display of the event log search screen 216, which is shown in greater detail in FIG. 9. From the event log search screen 216, the operator may enter search criteria with respect to dates, times and various other parameters. Pressing <F8> again initiates the search. Once the search is completed, an event log 250, as shown in greater detail in FIG. 12, comprising all the events that match the search criteria is displayed.

From the system status screen 202, pressing <F11> results in the display of the data capture status screen 218, as shown in greater detail in FIG. 10. The data capture status screen 218 shows data capture information for the selected host. The message below the title line indicates the status of the data capture. In the preferred embodiment, if data capture is not active the message following the host number and name is "data capture not active." If data capture is active, the message indicates the name for the data capture file and the number of records written so far, for example, "data being captured to hmmddqq.rrr, nnn records written." The file name represents the host number (h), month (mm), day (dd), sequence of run (rrr) and recipe number (nnn), From the data capture status screen 218, the operator can delete old data capture files by pressing <F7>, search for selected data capture files by pressing <F10> and graph captured data by pressing <F11>.

The operator's pressing <F7> results in the display of a delete data capture window 252 for prompting the operator to specify, by date or by percentage, capture files to be deleted. As previously indicated, such manual deletion of files may be an alternative or supplemental to a periodic archiving process, and therefore might not be implemented on a regular basis Pressing <F7> from the delete data capture window 252 results in the display of a delete by date screen 254 for enabling the operator to delete data capture files older than a specified date. After the operator has typed the date for the earliest file to be retained (i.e., not to be deleted), pressing <F7> causes all files older than the selected date to be deleted. Pressing <F8> from the data capture window 252 results in the display of a delete by percent screen 256 for enabling a operator to delete the oldest files until a certain percentage of disk space occupied by the files is freed up. In the preferred embodiment, the default value for disk space to be reclaimed is thirty percent (30%); however, the operator may enter any percentage value from one (1) to ninety nine (99). After the operator has typed the percentage of files to be deleted, a list of files to be deleted is displayed. If the operator determines that certain of the listed files should not be deleted, the file can be marked to be saved to diskettes prior to deletion thereof. Files are marked by highlighting the file, using the arrow keys, and then pressing <+>. After the operator has inserted a formatted disk to which the marked files are to be saved, the operator may press <F7> to proceed with the deletion and/or saving of the files. After the files have been deleted, the total disk space reclaimed and the percentage disk space reclaimed are displayed.

From the data capture status screen 218, pressing <F10> results in the display of a data capture search screen 258, which is shown in greater detail in FIG. 13. At that point, the operator may input information regarding which files are to be listed by specifying bank number, month, day, sequence number and recipe number thereof. Depression of <F11> once the search criteria have been entered results in the display of a list of files screen 260, shown in greater detail in FIG. 14, comprising a list of files that match the search criteria. From the list of files screen 260, the operator may graph the data contained in a data capture file in one of three ways. First, without selecting any of the files on the list of files screen 260, the operator may press <F11> to specify the name of a file to be graphed. Alternatively, the operator may select a single file from the screen 260 and then press <F11> to graph that file. Finally, the operator may select two files from the screen 260 and then press <F11> to graph the files.

In the preferred embodiment, real time graphing of data is accomplished as follows. While data is being collected by the supervisor computers and stored in data capture files, it may also be displayed on the display of the supervisor and/or engineering computer. The user may specify the data capture rate in the configuration file of the supervisor.

The operator may create graphs of captured data by first searching for the data capture files, as described above, or by pressing <F11> from the data capture status screen 218. Depression of <F11> from either the data capture status screen 218 or the list of files screen 260 results in the display of a data capture parameters screen 262, which is illustrated in greater detail in FIG. 15. In the preferred embodiment of the present invention, each graph may include up to six plots, which represent flow systems and other parameters. The operator may graph parameters from a single file, or from two files for comparison purposes. The operator selects the parameters to be plotted using the data capture parameters screen 262 by typing a number next to each parameter to be plotted. Once the parameters are chosen, pressing <F11> displays a graph screen 264 of the selected parameters for the selected file(s). An exemplary graph screen, containing two graphs corresponding to the data capture parameter screen 262 as shown in FIG. 15, is shown in FIG. 16.

Figures 15, 16:
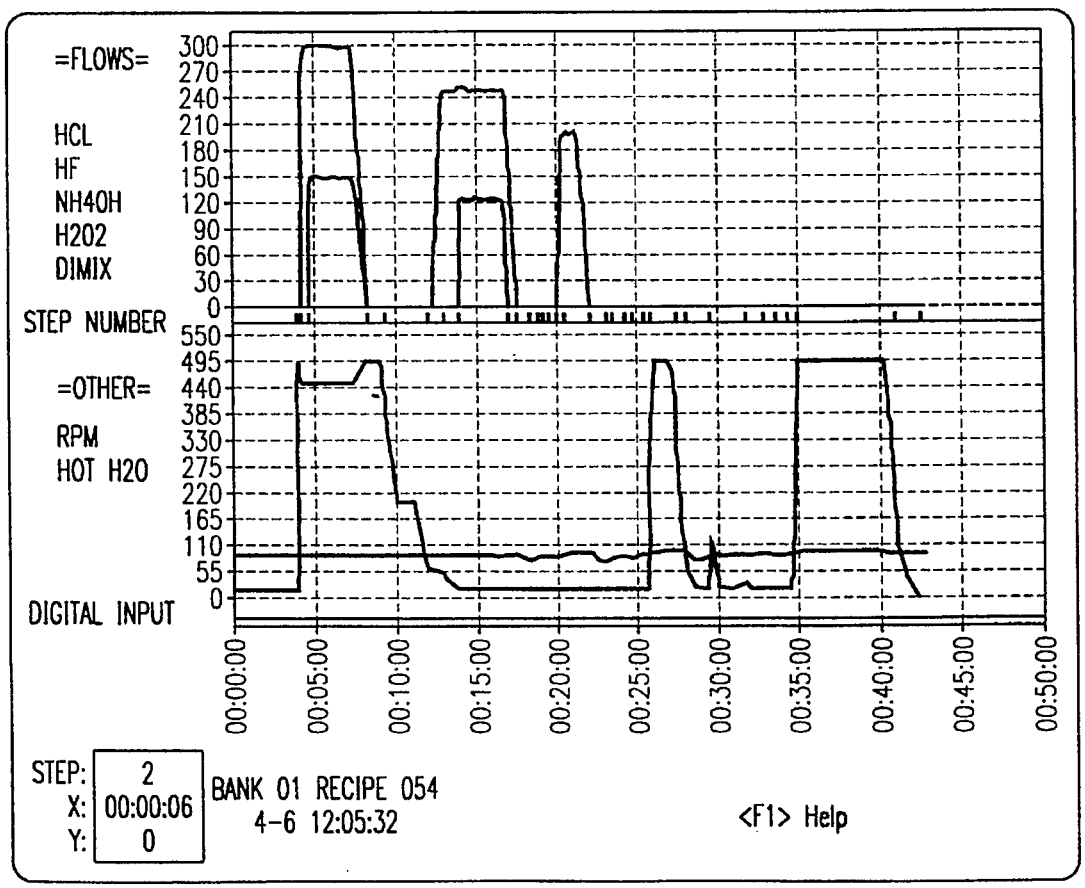
FIG. 15 illustrates a data capture parameters screen of the spray processor host system of the present invention.
FIG. 16 illustrates a graph screen of the spray processor host system of the present invention.

Referring to FIG. 16, from the graph screen 264, pressing <F1> displays help, including information about other active keys. Pressing <F3> enables the operator to change the time base of the X axis. Responsive to depression of <F3>, the operator is prompted to enter a new start end end time, upon entry of which, the graph is redrawn. Pressing <F4> enables the operator to change the flow range on the Y axis. Responsive to depression of <F4>, the operator is prompted to enter the lowest and highest values, respectively, for the flow system range, upon entry of which the graph is redrawn.

The information contained in the data capture files and event logs may be used for various diagnostic and optimization purposes. For example, the data may be used to generate flow stabilization algorithms and procedures for controlling chemical ratios, and thus clean efficiency and repeatability. In addition, the data may be used to implement machine operating protocols that insure process temperatures are at the desired value for optimal performance and device yield. Moreover, the data may be used in the detection of deteriorating equipment performance indicative of imminent equipment failure, as well as equipment failure analysis of system aborts, alerts or alarms.

As indicated above, in the presently preferred embodiment, the spray processor host system is implemented using a software utility that is run on all of the computers in the system (i.e., supervisor, engineer and bridge) and that contains the functionality for implementing each computer type. Accordingly, the functionality of each individual computer is determined by its configuration file, which is read at startup of the utility on each of the computers. In other words, as described below with reference to FIGS. 17 and 18, each computer implements only those portions of the utility comprising the functionality thereof as designated in its configuration file. As has also been previously indicated, each computer may be configured to function as one or more "types" of computers. For example, as shown in FIG. 1B, the computer 102 includes the functionality of both a supervisor and bridge. Similarly, although not shown, a single computer could be configured to function as both a supervisor and an engineer or an engineer and a bridge using the same utility and executing different modules thereof.

Figure 17:
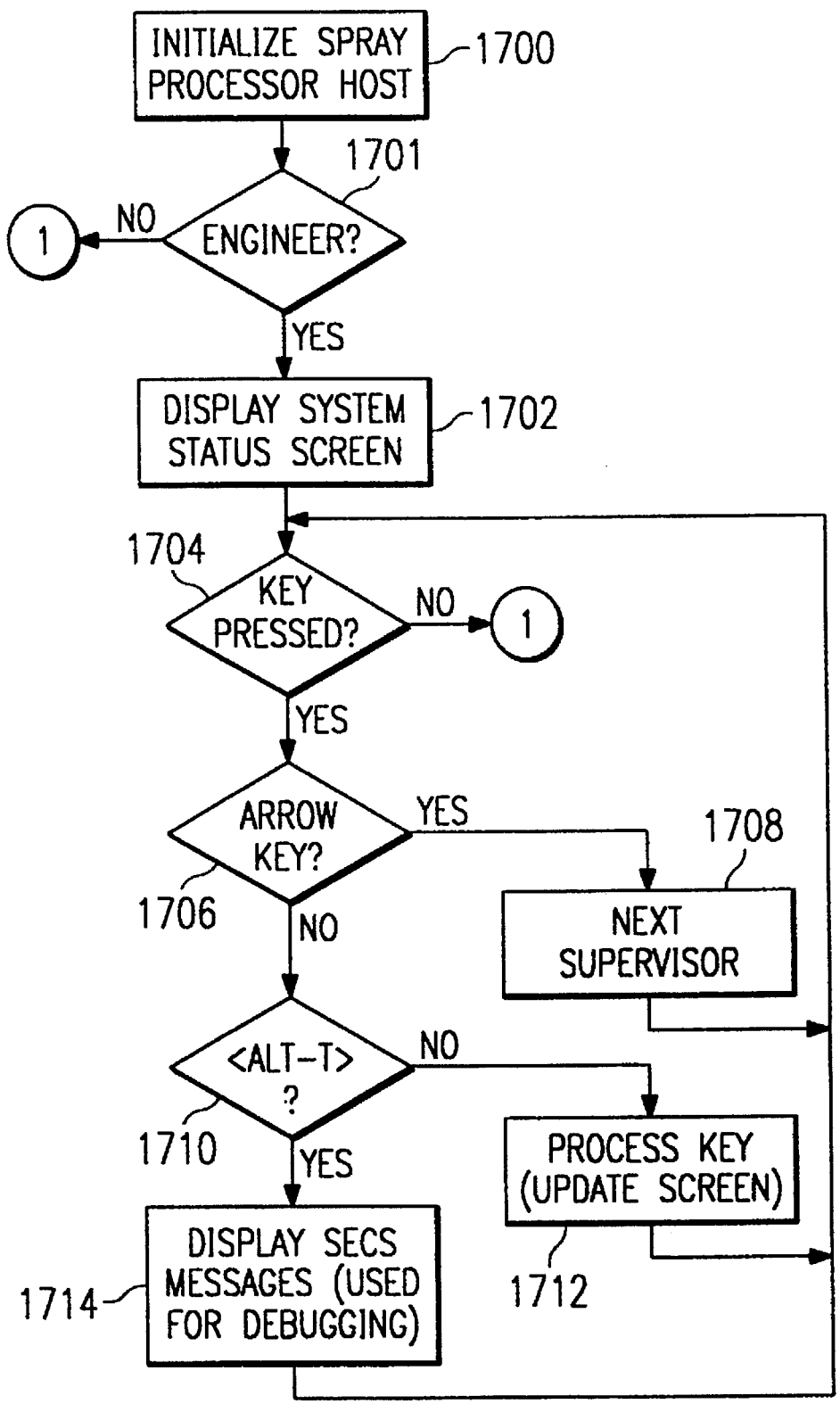
FIG. 17 is a flowchart of a preferred method of operation of the present invention.

FIG. 17 is a flowchart of a preferred method of operation of the present invention. Execution begins in step 1700, in which the system 100 is initialized. In step 1701, a determination is made whether the computer is an engineer computer, such as the engineer computer 106. This determination is made by referring to the configuration file of the computer. If the computer is an engineer computer, execution proceeds to step 1702; otherwise, execution proceeds to a background process, which will be described in detail below with reference to FIG. 18. In step 1702, the system status screen 202 (FIGS. 2 and 3) is displayed. In step 1704, a determination is made whether a key has been pressed. If not, execution proceeds to the background process (FIG. 18) described below. If in step 1704, it is determined that a key has been pressed, execution proceeds to step 1706, in which a determination is made whether an arrow key has been pressed, indicating that the user wants to select a different supervisor computer. If so, execution proceeds to step 1708, in which the system status screen for the next supervisor computer is displayed, and then returns to step 1704. If in step 1706 it is determined that an arrow key has not been pressed, execution proceeds to step 1710, in which a determination is made whether <ALT-T> has been pressed. If not, in step 1712 the screen is updated according to the key(s) pressed, as described above with reference to FIGS. 2–16; otherwise, execution proceeds to step 1714, in which the messages comprising communications between the current supervisor computer and its associated processor (hereinafter referred to as "SECS messages," as described in further detail with reference to FIG. 18) are displayed to enable a user to debug the process. Execution then returns to step 1704.

Figure 18:
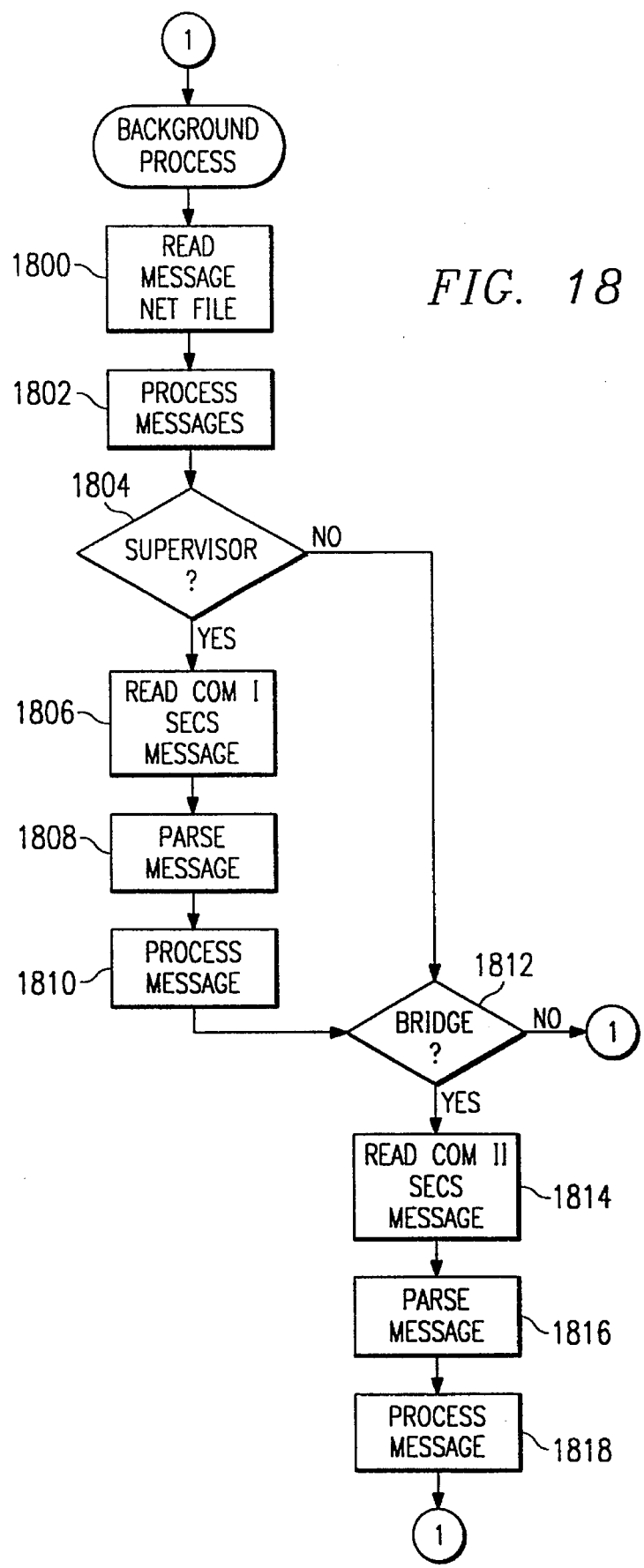
FIG. 18 is a flowchart of a background process of the present invention.

FIG. 18 is a flowchart of a background process of the present invention. which is continually executed by the supervisor, engineer and bridge computers comprising the spray processor host system of the present invention. As previously indicated, if in step 1701 a determination is made that the computer is not an engineer computer, or if in step 1704 a determination is made that no key has been pressed, execution proceeds to step 1800, in which a message net file, which is stored on a RAM drive (not shown) of the computer, is read. The message net file is used to store communications between the computer on which the file is stored and the other bridge, supervisor and engineer computers comprising the spray processor host system 100. In step 1802, the messages stored in the message net file are processed. In step 1804, a determination is made whether the computer is a supervisor computer. If so, execution proceeds to step 1806, in which the computer checks its COM1 port for a message, designated a COM1 SECS message, from its associated spray processor. The COM1 SECS message read in step 1806 is then parsed and processed in steps 1808 and 1810, respectively. Execution then proceeds to step 1812. Similarly, if in step 1804, there is no message net file message to be read, execution proceeds directly to step 1812.

In step 1812, a determination is made whether the computer is a bridge computer. If not, execution returns to step 1800; otherwise, execution proceeds to step 1814, in which a message, designated a COM2 SECS message, from the upstream host is read from the COM2 port of the computer and then parsed and processed in steps 1816 and 1818, respectively. If at any point during execution of the background process illustrated in FIG. 18 a key is pressed, execution will return immediately to step 1704 (FIG. 17). In this manner, while not processing keystrokes, each computer is constantly reading and processing communications from other devices within and outside the system 100.

It is understood that the present invention can take many forms and embodiments. The embodiments shown herein are intended to illustrate rather than to limit the invention, it being appreciated that variations may be made without departing from the spirit of the scope of the invention. For example, upstream hosts other than Workstream may be used. In addition, rather than archiving data capture files on a separate archive computer 109a, each supervisor computer may be equipped with large disk drives capable of storing more than a few weeks worth of files, in which case, data capture files could be automatically deleted as specified in the configuration file of the supervisor and the archive computer 109a would be used for storing backup copies of the system files of each supervisor computer. Moreover, any combination of the bridge, supervisor and engineer computer functions may be implemented by a single personal computer, a single bridge/supervisor computer combination may provide an upstream communications link for multiple (i.e., up to seven additional) supervisor computers, and a single supervisor computer may be configured to supervise more than one processor. Still further, rather than being implemented using a single utility comprising the functionality of all three types of computers, the present invention could be implemented using three separate utilities, each comprising the functionality of a single type of computer, in which case the functionality of the computer would be determined by the identity of the utility executed thereby.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A system for providing integrated monitor and control functions for a semiconductor spray process tool, the system comprising:

a supervisor device electrically connected to said spray process tool for collecting and storing on a mass storage device of said supervisor device equipment status and process data generated by said spray process tool during each process run and for storing a plurality of process recipes executable by said spray process tool;

an engineer device electrically connected to said supervisor device generating control signals to said spray process tool via said supervisor device, said control signals including process recipe download requests for causing said supervisor device to download requested ones of said process recipes to said spray process tool for execution, said engineer device receiving said collected equipment status and process data from said supervisor device and being capable of displaying said received equipment status and process data in at least one user-selected format.

2. The system of claim 1 further comprising a bridge device electrically connected to said supervisor device and said engineer device, said bridge device providing a communications link between said system and an upstream host, said upstream host being capable of generating control signals to said spray process tool via said supervisor device.

3. The system of claim 1 further comprising an archive device electrically connected to said supervisor device and said engineer device, said archive device comprising a mass storage device having substantially more storage capacity than said supervisor device mass storage device, said archive device mass storage device for storing data files comprising said collected equipment status and process data, backup copies of said process recipes and other system files of said supervisor device.

4. The system of claim 1 wherein said engineering device is further capable of displaying a process recipe being executed by said spray process tool and providing an indication of a current step of said displayed process recipe.

5. The system of claim 3 wherein said engineering device is further capable of displaying contents of selected ones of said data files stored on said archive device mass storage device.

6. The system of claim 1 further comprising a printer electrically connected to said engineer device for printing said received equipment status and process data in said user-selected format.

7. The system of claim 1 wherein said engineer device further comprises a modem for enabling remote control of said spray process tool and said supervisor device.

8. The system of claim 1 wherein said process data comprises chemical flow rates, turntable rotational speed and process temperature, and wherein said at least one user selected format comprises a graph of said process data.

9. The system of claim 1 wherein said control signals comprise start and abort requests for respectively starting and aborting a current process run.

10. The system of claim 1 wherein said control signals comprise an alarm clear signal for clearing an alarm condition of said spray process tool.

11. The system of claim 1 wherein said engineer device and said supervisor device comprise a single personal computer.

12. The system of claim 2 wherein said bridge device and said supervisor device comprise a single personal computer.

13. The system of claim 2 wherein said bridge device, said engineer device and said supervisor device comprise a single personal computer.

14. The system of claim 1 wherein said supervisor device mass storage device comprises a hard disk drive.

15. The system of claim 3 wherein said archive device mess storage device comprises a hard disk drive.

16. Apparatus for providing integrated monitor and control functions for a semiconductor spray process tool, the apparatus comprising:

means connected to said spray process tool for collecting equipment status and process data generated by said spray process tool during each process run;

means for storing said collected equipment status and process data and a plurality of process recipes executable by said spray process tool;

means for causing said receiving means to download a designated one of said process recipes to said spray process tool for execution thereby;

means for receiving said equipment status and process data from said collection means and for displaying said equipment status and process data in at least one user-selected format.

17. The apparatus of claim 16 further comprising means for providing a communications link between said apparatus and an upstream host, said upstream host being capable of controlling operation of said collection means and said spray process tool.

18. The apparatus of claim 16 further comprising means for periodically archiving data files comprising said collected equipment status and process data and backup copies of said process recipes.

19. The apparatus of claim 16 wherein said means for receiving and displaying is further capable of displaying a process recipe being executed by said spray process tool and providing an indication of a current step of said displayed process recipe.

20. The apparatus of claim 16 further comprising a printer electrically connected to said means for receiving and displaying for printing said received equipment status and process data in said user-selected format.

21. The apparatus of claim 16 wherein said means for receiving and displaying further comprises a modem for enabling remote control and monitoring of said spray process tool.

22. The apparatus of claim 16 wherein said process data comprises chemical flow rates, turntable rotational speed and process temperature, and wherein said at least one user selected format comprises a graph of said process data.

23. The apparatus of claim 18 wherein said means for receiving and displaying further comprises means for displaying contents of selected ones of said archived data files.

24. The apparatus of claim, 16 wherein said collection means and said receiving and displaying means comprise personal computers.

25. The apparatus of claim 17 wherein said means for providing a communications link comprises a personal computer.

26. The apparatus of claim 18 wherein said archiving means comprises a personal computer.

27. A system for providing integrated monitor and control functions for a plurality of semiconductor spray process tools, the system comprising:

a plurality of supervisor computers each associated with one of said spray process tools for collecting and storing on a hard disk drive of said supervisor computer equipment status and process data generated by said associated spray process tool during each process run and for storing a plurality of process recipes executable by said associated spray process tool;

an engineer computer electrically connected to said supervisor computers for generating control signals to said spray process tools via said associated supervisor computers, said control signals including process recipe download requests for causing said supervisor computers to download requested ones of said process recipes to said associated spray process tools for execution, said engineer computer receiving said collected equipment status and process data from said supervisor computers and being capable of displaying said received equipment status and process data for selected ones of said spray process tools in at least one user-selected format;

a bridge computer electrically connected to said supervisor computers and said engineer computer, said bridge computer providing a communications link between said system and an upstream host, said upstream host being capable of generating control signals to said spray process tools via said associated supervisor computers; and an archive computer electrically connected to said supervisor computers and said engineer computer, said archive computer comprising a hard disk drive having substantially more storage capacity than said supervisor computer hard disk drive, said archive computer hard disk drive for storing data files comprising said collected equipment status and process data and backup copies of said process recipes.

28. The system of claim 27 wherein said engineering computer is further capable of displaying a process recipe being executed by a selected one of said spray process tools and providing an indication of a current step of said displayed process recipe.

29. The system of claim 27 wherein said engineering computer is further capable of displaying contents of selected ones of said data files stored on said archive computer hard disk drive.

30. The system of claim 27 further comprising a printer electrically connected to said engineer computer for printing said received equipment status and process data in said user-selected format.

31. The system of claim 27 wherein said engineer computer further comprises a modem for enabling remote control of said spray process tools and said associated supervisor computers.

32. The system of claim 27 wherein said engineer computer comprises one of said supervisor computers.

33. The system of claim 27 wherein said bridge computer comprises one of said supervisor computers.

34. A method of providing integrated monitor and control functions for a semiconductor spray process tool, the method comprising:

collecting equipment status and process data generated by said spray process tool during each process run;

storing said collected equipment status and process data and a plurality of process recipes executable by said spray process tool on a first storage device;

generating control signals to said spray process tool for controlling operations thereof, said control signals including process recipe download requests for causing requested ones of said process recipes to be downloaded from said first storage device to said spray process tool for execution; and displaying said collected equipment status and process data in at least one user-selected format.

35. The method of claim 34 further comprising providing a communications link between said spray process tool and an upstream host, said upstream host generating control signals to said spray process tool for controlling operations thereof.

36. The method of claim 34 further comprising periodically archiving data files comprising said collected equipment status and process data and backup copies of said process recipes on a second storage device having substantially more storage capacity than said first storage device.

37. The method of claim 34 further comprising displaying a process recipe being executed by said spray process tool and providing an indication of a current step of said displayed process recipe.

38. The method of claim 36 further comprising displaying contents of selected ones of said data files stored on said second storage device.

39. The method of claim 34 further comprising printing said received equipment status and process data in said user-selected format.

40. The method of claim 34 further comprising providing a modem for enabling remote control of said spray process tool.

41. The method of claim 34 wherein said process data comprises chemical flow rates, turntable rotational speed and process temperature, and wherein said at least one user selected format comprises a graph of said process data.

42. The method of claim 34 wherein said control signals comprise start, stop and abort requests for respectively starting, stopping and aborting a current process run.

43. The method of claim 34 wherein said control signals comprise an alarm clear signal for clearing an alarm condition of said spray process tool.

44. A method of providing integrated monitor and control functions for a semiconductor spray process tool, the method comprising:

collecting equipment status and process data generated by said spray process tool during each process run;

storing said collected equipment status and process data and a plurality of process recipes executable by said spray process tool on a first hard disk drive;

generating control signals to said spray process tool for controlling operations thereof, said control signals including process recipe download requests for causing requested ones of said process recipes to be downloaded from said first hard disk drive to said spray process tool for execution;

displaying said collected equipment status and process data in at least one user-selected format;

providing a communications link between said spray process tool and an upstream host, said upstream host generating control signals to said spray process tool for controlling operations thereof; and periodically archiving data files comprising said collected equipment status and process data and backup copies of said process recipes on a second hard disk drive having substantially more storage capacity than said first hard disk drive.

45. The method of claim 44 further comprising displaying a process recipe being executed by said spray process tool and providing an indication of a current step of said displayed process recipe.

46. The method of claim 44 further comprising displaying contents of selected ones of said data files stored on said second hard disk drive.

47. The method of claim 44 further comprising printing said received equipment status and process data in said user-selected format.

48. The method of claim 44 further comprising providing a modem for enabling remote control of said spray process tool.

* * * * *

UNITED STATES PATENT AND TRADEMARK OFFICE
CERTIFICATE OF CORRECTION

PATENT NO. : 5,591,299

DATED : Jan. 7, 1997

INVENTOR(S) : Jay J. Seaton et al.

It is certified that error appears in the above-indentified patent and that said Letters Patent is hereby corrected as shown below:

Please change all occurrences of "processor 104" to --processor 10--.

Please change all occurrences of "status message 304" to -- status message 302--.

Please change all occurrences of "a key definition section 302" to --a key definition section 304--.

Please change all occurrences of "the system status screen 200" to --the system status screen 202--.

Please change all occurences of "the graph 402" to --the graph 404--.

Col. 3, line 17, "location" should be --locations--.

Col. 4, line 56, "processor" should be --processor 10, as briefly described--.

Col. 5, line 55, "109b i" should be --109b--.

Col. 6, line 29, "each" should be the first word of a new paragraph.

Col. 7 line 7, "downloading handling," should be --downloading, error handling,--

UNITED STATES PATENT AND TRADEMARK OFFICE
CERTIFICATE OF CORRECTION

PATENT NO. : 5,591,299

DATED : Jan. 7, 1997

INVENTOR(S) : Jay J. Seaton et al.

It is certified that error appears in the above-indentified patent and that said Letters Patent is hereby corrected as shown below:

Col. 7 line 65, "are also In" should be --are also transmitted to the supervisor computer 102, via path 152, workstream database 112 and path 154, which forwards them for execution by the spray processor 10 via path 156. The spray processor 10 constantly transmits equipment status and process data to the supervisor computer 102, as indicated by a path 158, which data is transmitted to the supervisor hard drive 103, as indicated by a path 160, for storage in data files. Equipment status and real time data from the spray processor 10 are also transmitted to the engineering computer 106, as indicated by a path 162, and equipment status data is transmitted to the VAX terminal 114 via the workstream database 112, as indicated by paths 164, 166. The data files comprising equipment status and process data from the spray processor 10 and stored on the supervisor hard drive 103 are periodically uploaded to the archive hard drive 109b via the archive computer 109a, as indicated by paths 168 and 169, from which they may be accessed by the engineering computer 106, as indicated by a path 170. Equipment status and historical data stored on the supervisor hard drive 103 may be subsequently accessed for use by the supervisor computer 102 via the path 155.

As previously indicated, on each computer is stored a configuration file unique to the particular computer and, if the computer is a supervisor, the processor to which it is connected. The configuration file, designated #CONFIG.FSI, is read at startup of the spray processor host system to determine the functionality of the computer,i.e., supervisor, engineer, bridge, or any combination thereof. As will be described in greater detail with reference to FIGs. 17 and 18, the use of a configuration file such as that described below enables a single software utility program comprising separate modules for implementing the functionality of each of the three types of computers to be run on all of the computers in the system 100, with the functionality of the particular computer being determined by its configuration file. In other words, one purpose

UNITED STATES PATENT AND TRADEMARK OFFICE
CERTIFICATE OF CORRECTION

PATENT NO. : 5,591,299

DATED : Jan. 7, 1997

INVENTOR(S) : Jay J. Seaton et al.

Page 3 of 4

It is certified that error appears in the above-indentified patent and that said Letters Patent is hereby corrected as shown below:

of the configuration file is to specify which of the three modules of the software utility the computer is to run. In--

Col. 8, line 42, "backup copes" should be --backup copies--.

Col. 8, line 66, "d:544 fsicap" should be --d: fsicap--.

Col. 9, line 9, "544 544 PC_BACKUP544 a544 CAPTURE" should be -- \\ PC_BACKUP\a"\CAPTURE--.

Col. 9, line 11, 544 544 computer name544 disk:544 directory" should be --\\computer name\ disk:\ directory--.

Col. 11, line 17, "1-4" should be --10--.

Col. 11, line 35, "processor name" should be --processor name--.

Col. 11, line 36, "Status" should be --Status--.

Col. 13, line 4, "recip" should be --recipes, and an--.

Col. 14, line 63, (nnn)," should be --(nnn).--

Col. 15, line 5, "process." should be -process--.

Col. 15, line 7, "basis Pressing" should be --basis. Pressing--.

Col. 16, line 5, "start end end" should be --start and end--.

Col. 17, line 10, "message net" should be --message.net--.

UNITED STATES PATENT AND TRADEMARK OFFICE
CERTIFICATE OF CORRECTION

PATENT NO. : 5,591,299

DATED : Jan. 7, 1997

INVENTOR(S) : Jay J. Seaton et al.

It is certified that error appears in the above-indentified patent and that said Letters Patent is hereby corrected as shown below:

Col. 17, line 12, "message net" should be --message.net--.

Col. 17, line 16, "message net" should be --message.net--.

Col. 17, line 23, "message net" should be --message.net--.

Col 19, Claim 15, line 7, "mess" should be --mass--.

Signed and Sealed this

Seventh Day of October, 1997

Attest:

BRUCE LEHMAN

Attesting Officer

Commissioner of Patents and Trademarks